O. ONEAL.
DEMOUNTABLE RIM.
APPLICATION FILED FEB. 17, 1917.

1,272,342.

Patented July 9, 1918.
2 SHEETS—SHEET 1.

WITNESSES

INVENTOR
O. O'Neal,
BY Victor J. Evans
ATTORNEY

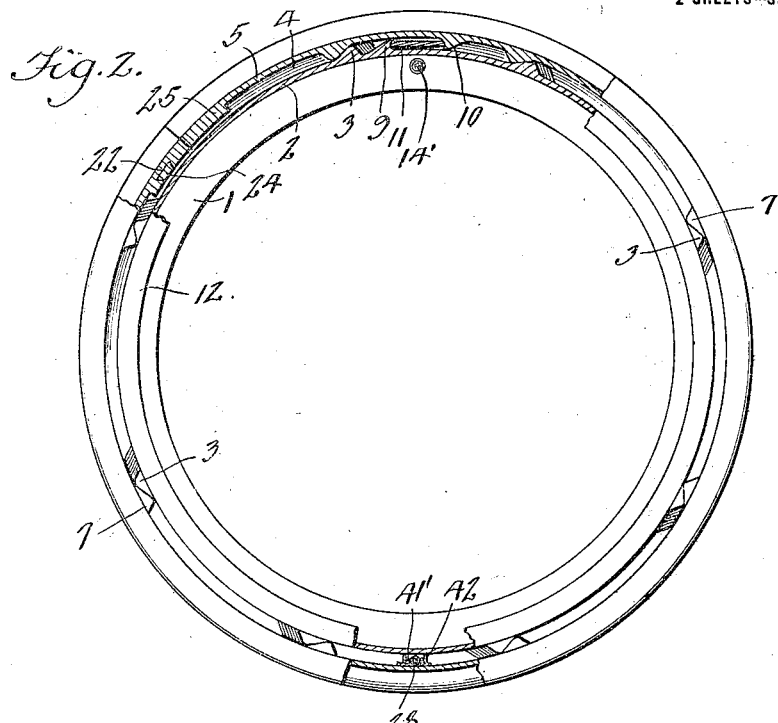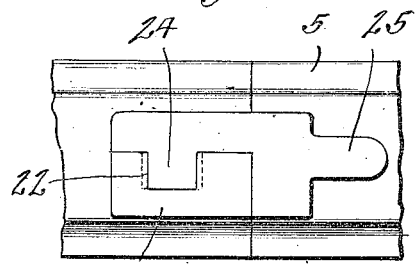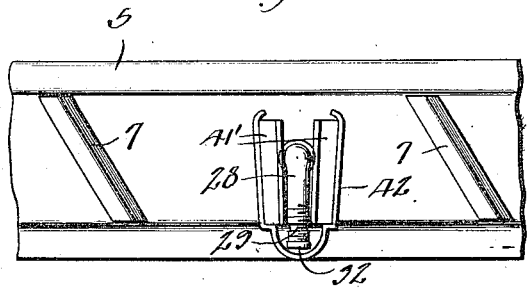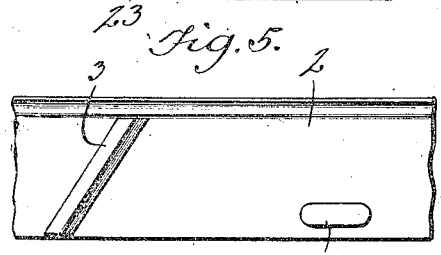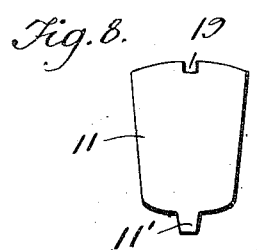

UNITED STATES PATENT OFFICE.

OSCAR ONEAL, OF FREMONT, MICHIGAN

DEMOUNTABLE RIM.

1,272,342.   Specification of Letters Patent.   Patented July 9, 1918.

Application filed February 17, 1917. Serial No. 149,247.

*To all whom it may concern:*

Be it known that I, OSCAR ONEAL, a citizen of the United States, residing at Fremont, in the county of Newaygo and State of Michigan, have invented new and useful Improvements in Demountable Rims, of which the following is a specification.

My invention relates to demountable rims and relates particularly to demountable rims upon which pneumatic rubber tires are mounted, though not limited to that use alone.

My invention has for its objects: first, to provide an efficient demountable rim which cannot loosen up in the ordinary running of the wheel to which it is attached; second, to provide a demountable rim which can be put on and taken off of the wheel with a minimum amount of exertion and time.

I attain these objects by the mechanism illustrated in the accompanying drawings forming a part of this specification, in which:

Fig. 2 is a partial sectional front elevation of the same.

Fig. 4 is a side elevation of a portion of the inner surface of the outer rim.

Fig. 5 is a side elevation of the corresponding outer surface of the inner rim.

Fig. 6 is a side elevation of a portion of the inner surface of the outer rim.

Fig. 8 is a detail view of the wedge.

Like characters of reference indicate like parts in the various views.

Figure 1:
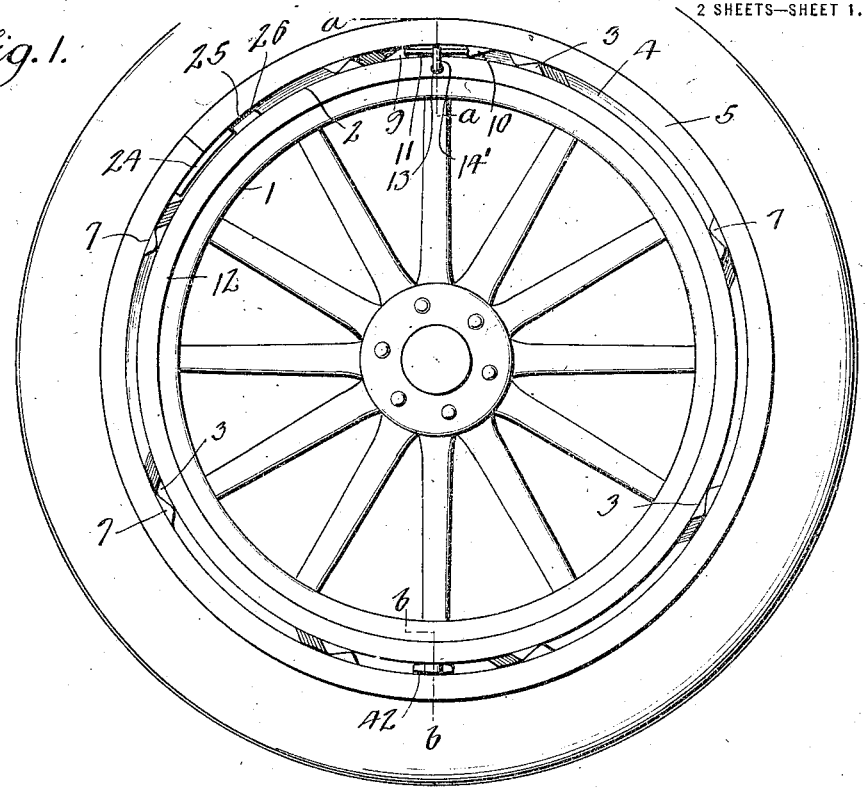
Figure 1 is a front elevation of a vehicle wheel embodying my invention.
Figure 3:
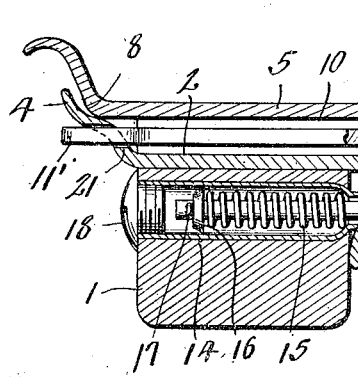
Fig. 3 is an enlarged sectional view on the line *a—a* of Fig. 1.
Figure 7:
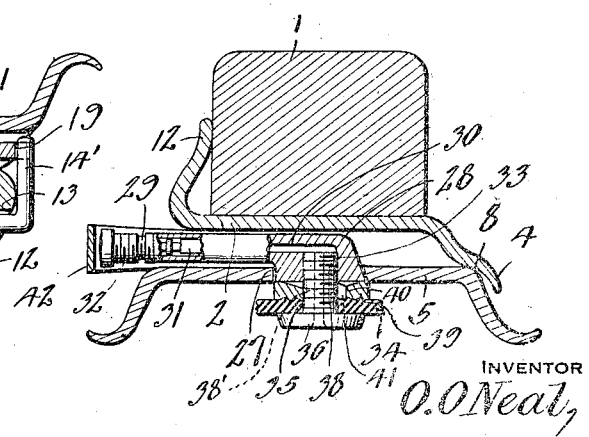
Fig. 7 is a transverse sectional view through the wheel taken at the valve stem.

In the drawings 1 designates the felly of a wheel upon the circumferential surface of which an inner rim 2 is fixedly mounted. Outwardly extending lugs 3 are formed on the outer surface of said rim at intervals around the circumference of the same, and extend obliquely to the elements of said outer surface, all of the said lugs having the same angularity respecting the elements of said surface and extending in the same direction relative to said elements. A circumferential flange 4 is formed on the far edge of said inner rim and extends outwardly from said rim. An outer rim 5 is provided, the diameter of the inner surface of which is adapted to engage the tops of lugs 3 of said inner rim. Inwardly extending lugs 7 are formed on the inner surface of said outer rim 5 at intervals corresponding to the intervals at which lugs 3 are disposed upon said inner rim. Said lugs 7 have the same angularity respecting the elements of said inner surface as lugs 3 have respecting the outer surface of said inner rim and extend in the same direction. The height of said lugs 7 is substantially the same as that of lugs 3. The far edge 8 of said outer rim 5 is adapted to abut said circumferential flange 4. A positioning shoulder 9 is disposed on the outer surface of said inner rim. An opposing positioning shoulder 10 is disposed upon the inner surface of said outer rim far enough away from said shoulder 9 when the rims are in locked position so that the lugs 7 and 3 may be properly disengaged to remove said outer rim from said inner rim as hereinafter described. A positioning wedge 11 is provided having its lateral edges engageable with the opposing faces of said positioning shoulders. In applying the outer rim to the inner rim the outer rim is positioned circumferential respecting said inner rim so that the far ends of lugs 7 will clear the near end of lugs 3 when said outer rim is moved laterally upon said inner rim. The outer rim is then pushed on to the inner rim until the far edge 8 of the inner rim abuts the circumferential flange 4 to the inner rim. The outer rim is then moved circumferentially so that the lugs 7 are brought into working relation with said lugs 3. The opposing faces of positioning shoulders 9 and 10 are moved away from each other in this movement, and when the lugs 3 and 7 are in engagement and the edge 8 and flange 4 abut each other, the wedge 11 is placed between shoulders 9 and 10 and forced into place. This movement of wedge 11 tends to move the outer rim circumferentially about the inner rim and forces lugs 3 and 7 into a tight engagement. By reason of the oblique engagement of the lugs 3 and 7 and the direction of the same respecting the wedging action above referred to, the outer rim is forced laterally toward the far edge of the inner rim. The engagement of the far edge 8 of the outer rim and flange 4 of the inner rim confines the lateral movement of said outer rim. Thus, the engagement of wedge 11 with opposing shoulders 9 and 10 holds lugs 3 and 7 in engagement and by means of the engagement of said lugs holds the far edge 8 and flange 4 in engagement, and thereby firmly holds the outer rim upon the inner rim. An inwardly extending flange 12 is formed on the near edge of the inner rim. A hole 13 is provided therein in proximity to the working surface of shoulder 10. A laterally extending inclosure 14 is formed in the felly of the wheel and communicates with said hole 13. A locking pin 14 is disposed in said hole and extends into said inclosure. A compression spring 15 is disposed upon said pin in said inclosure, having its near end engaging the bottom of said inclosure, and having its other end engaging a washer 16 mounted on the end of said pin and secured thereto by a cotter pin 17 engaging a transverse hole in said pin near the end thereof. By reason of its engagement with said pin, said spring tends to pull the pin into the inclosure. A dust cap 18 is screw threaded in the open end of said inclosure to prevent mud and dirt getting into said inclosure. The outer end of said pin 14 is formed transversely to the body of the pin and is adapted to engage a notch 19 on the near edge of the wedge 11 when said wedge is in place between the shoulders 9 and 10. Said spring 15 is strong enough to hold said wedge 11 from working out of its proper position during the use of the rim.

The far edge of wedge 11 has a projection 11 formed thereon which extends through a slot 21 in flange 4 when said wedge is in working position. In removing said wedge preparatory to removing the outer rim the pin 14 is raised and rotated so that the outer end of the same will not interfere with the removal of wedge 11. The projection 20 is then tapped lightly with a hammer or other similar tool and the wedge is thus loosened from engagement with shoulders 9 and 10. The rim is then moved circumferentially so that lugs 3 and 7 are free from each other and the rim is then moved laterally and disengaged from the inner rim.

In order that a pneumatic tire may be easily applied the outer rim is split laterally. On one side of the split a laterally extending slot 22 is formed having its sides longitudinally parallel and slanting laterally toward each other so that the top of the slot is narrower than the bottom. The near end of said slot is open while the far end is provided with a stop 23. A hook 24 is formed on said rim on the other side of said split and extends beyond the same for engagement with said slot. The end of said hook is formed to engage slot 22 so that by said engagement the rim is firmly held in shape, and said hook can only be withdrawn from said slot by laterally moving the hook end of said rim toward the near side of the slot end of said rim. The rim is flexible enough to allow this movement. A circumferential extending shoulder 25 is formed on said outer rim near said hook. A plug 26 is formed on said inner rim and so positioned respecting said shoulder 25 that when the outer rim is locked upon said inner rim its far edge engages the near edge of shoulder 25 and thus positively prevents hook 24 from withdrawing from or tending to withdraw from said slot 22 when the rims are in locked position. The engagement of hook 24 with slot 22 prevents the ends of the outer rim from spreading.

It will be noted that by reason of the circumferential movement of the outer rim respecting the inner rim which is necessary to apply the rim or to demount the same, the ordinary radially disposed valve stem which is generally used on pneumatic tires, and which extends through a hole in the inner rim and the felly of the wheel, would necessarily have to extend through a circumferentially disposed slot in said inner rim and felly to allow my rim to be put on or demounted. A slot of the proper length for this purpose would weaken the rim and felly somewhat. I provide a valve stem of a construction which is adapted for use on any type of rim and which dispenses with the necessity of removing the outer rim by pulling the sides of the outer rim opposite from the valve stem off from the inner rim first. This method of removing necessitates the outer rim fitting on the inner rim very loosely. Creeping results from this loose fit, and the locking means of the rims are soon loosened. A hole 27 is provided in the outer rim. An angular valve stem 28 is provided which projects through said hole 27 and extends laterally on the inner surface of said outer rim to the near side thereof and terminates in a screw threaded end 29. A longitudinal hole 30 is formed in said laterally extending end and is screw threaded and shouldered to receive the check valve 31 of usual construction and a cap 32 of usual construction engages the screw threads at the end 29. The other end of said valve stem has an enlarged screw threaded recess 33 formed therein, the open side of said recess facing outwardly. Hole 30 communicates with said recess 33. An inner tube 34 of usual construction is provided with a hole 35. A stem 36 is provided having a broad flange formed at one end and adapted to engage the inner surface of tube 34. The stem 36 extends through said hole 35 and terminates in a screw threaded end 38 which is adapted to engage the screw threaded recess 33. A longitudinally extending hole 38 is formed in said stem 36. A washer 39 is provided having a hole therein adapted to slide over stem 36. A key-way 40 in said hole is adapted to engage a projection 41 on stem 36 to prevent said washer from rotating on said stem. Said washer 39 is adapted to be engaged with a wrench of usual construction.

In the assembly of the valve stem the parts are assembled as before described and the angular stem 28 tightened upon stem 36 so that it extends laterally to the plane of the inner tube. In applying a tire to said rim 5 said stem 28 is positioned so that it extends toward the near side of said outer rim. Two laterally disposed shoulders 41 are formed on rim 5 on opposite sides of the hole 27 and prevent the valve stem 28 from turning on its threaded engagement the stem 36, and thus loosening and allowing air to escape from the tube 34. A cover 42 is provided and is held upon said shoulders 41 by a spring engagement therewith and is adapted to protect the valve stem from injury.

Having thus fully described my invention, I claim:

In a vehicle wheel an inner rim, lugs formed on the outer surface of said inner rim, an outer rim, lugs formed upon the inner surface of said outer rim and engageable with said lugs on said inner rim, a flange on said inner rim engaged by said outer rim for preventing lateral displacement thereof, spaced shoulders on the inner and outer peripheries of said outer and inner rims respectively, a wedge driven between said shoulders whereby said outer rim is moved to engage said lugs with one another, a reduced tongue on the narrow end of said wedge passing through a hole in said flange, a socket member secured laterally of the felly, a pin slidable and rotatable in said socket and having an angular end engageable within the notch in the wide end of said wedge, and a spring surrounding said pin within said socket and holding said angular end in engagement with said wedge.

In testimony whereof I affix my signature.

OSCAR ONEAL.